Patented Oct. 13, 1953

2,655,523

UNITED STATES PATENT OFFICE 2,655,523

PREPARATION OF ALKYL TITANATES

Daniel F. Herman, Queens, N. Y., assignor to National Lead Company, New York, N. Y., a corporation of New Jersey No Drawing. Application February 8, 1951,
Serial No. 210,089

9 Claims. (Cl. 260—429)

This invention relates to a method for preparing metallo-organic compounds. More specifically, this invention relates to a method for preparing alkyl titanates.

Many methods have been proposed and employed for the preparation of alkyl titanates. Among such known methods is one in which titanium tetrachloride is reacted with an alcohol in the presence of ammonia in which the reaction is carried out in the presence of a large excess of alcohol. In such a reaction, the ammonium chloride formed is crystallized from solution and must be filtered from the alcoholic solution containing the alkyl titanate. Such a filtration is difficult to employ since the filtration must be carried out in a closed system. This filtration step results in an expensive process due to the handling losses involved and the absorptive characteristics of the crystals formed.

An object of this invention, therefore, is to prepare alkyl titanates by a process which eliminates the filtration step of the ammonium chloride formed. A further object is to provide a process which is easy to operate and economical to employ. These and other objects will become apparent from the following more complete description of the present invention.

Broadly, this invention contemplates a method for preparation of alkyl titanates which comprises admixing titanium tetrachloride, an alcohol containing at least two carbon atoms and liquid ammonia in a closed system, the ammonia being present in amount at least equal to, and for optimum efficiency preferably in slight excess of, that required to react with the chloride ions released from the tetrachloride plus the amount to dissolve the ammonium chloride formed by the reaction, and separating the liquid alkyl titanate layer from the liquid ammonia-ammonium chloride layer, the entire process being carried out in the anhydrous state.

The titanium tetrachloride, alcohol and liquid ammonia may be added in any order, but it is preferred to first admix the titanium tetrachloride and the alcohol and then to add the resulting mixture to the liquid ammonia.

The reaction must be carried out under anhydrous conditions and the ammonia employed must be maintained in the liquid state. The reaction must therefore be carried out in a closed system, the pressure in which will be at least equal to the vapor pressure of liquid ammonia at the temperature employed. This temperature is not critical, and it has been found most convenient to operate in the neighborhood of room temperature.

While this invention is useful in the preparation of the titanate of most any alcohol that has two or more carbon atoms in the molecule, it is particularly advantageous in the preparation of the titanates of alcohols having from 2 to 20 carbon atoms. Also, it is preferable, wherever possible, to use primary or secondary, monohydric, non-substituted aliphatic alcohols, since these give the best yields of alkyl titanate.

The use of a moderate excess, say 25% over the stoichiometric quantity, tends to improve the yield somewhat; however, for most purposes a small excess, for example about 5%, or even stoichiometric amounts of alcohol may be employed with satisfactory results.

In order to minimize the amount of ammonium chloride formed by the reaction between liquid ammonia and the HCl formed from the alcohol and titanium tetrachloride, it is desirable to remove as much of the liberated HCl from the mixture of titanium tetrachloride and alcohol as possible, before admixture with the ammonia. This may be accomplished by subjecting the mixture to the action of a stream of non-reacting gas, such as dry air, by passing the gas through the mixture to sweep out the HCl. It has been found that up to about 50% of the theoretical amount of HCl produced may be removed by this procedure.

As the ammonium chloride formed is dissolved in the ammonia and approaches the saturation point, the solution increases in density and may approach the density of the alkyl titanate product. It has been found that the two layers formed by the reaction may be readily separated from one another if a difference of at least 0.01 gram/cc. between the densities of the two products is maintained. The ammonia-ammonium chloride layer will ordinarily be the lighter of the two; however, as the ammonia layer becomes high in dissolved ammonium chloride, and providing the alkyl titanate prepared is of lower density than a saturated solution of ammonium chloride in liquid ammonia, the ammonia-ammonium chloride layer may be the heavier of the two, and gravity separation will be equally effective.

In order to illustrate more fully the practical application of the present invention the following examples are given to show various typical operations which fall within the scope of the instant invention.

*Example I*

In order to prepare tetrabutyl titanate, 1520 parts of TiCl₄ were added to 2370 parts of n-butanol over a period of four hours. These proportions correspond to the theoretical requirements to produce tetrabutyl titanate. The rate of addition of the TiCl₄ was controlled to keep the temperature of the mixture between 45 and 50° C., so as to minimize volatilization losses. Rapid evolution of HCl occurred toward the end of the addition. When the addition was complete, the mixture was analyzed and founded to contain 15.8% titanium, calculated as TiO₂, and 22.7% chlorine, indicating that 18.7% of the theoretical quantity of HCl produced had been volatilized.

400 parts of this mixture were mixed with 58.8 parts of butanol, giving a 25% excess of butanol over that theoretically required to form tetrabutyl titanate.

The adjusted mixture was then blown into a closed water-jacketed reactor containing 462 parts of liquid ammonia at 22° C. at a pressure of 125 p. s. i. The reactor was provided with a sight-glass for observation of the reaction. Addition of the alcohol-TiCl4 mixture was made through a valved inlet below the surface of the ammonia, and the addition took place over a 40-minute period. During the addition period, the temperature in the reactor rose from 22° C. to 43° C., and the corresponding pressure rose from its original value of 125 p. s. i. up to 230 p. s. i. Cooling water was run through the jacket throughout the reaction to prevent excessive temperature and pressure rise. When the addition was complete, the contents of the reactor were examined through the sight-glass and were present as two distinct liquid layers with a sharp interface. The lower layer contained the butyl titanate product, some of the excess butanol, and a small amount of dissolved NH3, and was yellow in color and slightly cloudy, due to the presence of small amount of solid residue. The upper layer contained the by-product, ammonium chloride, and the remainder of the excess butanol dissolved in the liquid ammonia.

The density of the upper layer was approximately 0.88, and the butyl titanate layer about 0.98, giving very rapid separation of the two layers.

The lower (butyl titanate) layer was drawn off through a valve in the bottom of the reactor and was distilled under reduced pressure. A fore-run containing the excess butanol was obtained, in addition to 215 parts of tetrabutyl titanate fraction boiling at 160–162° C. under 3 mm. pressure. This corresponded to 80% of the theoretical yield of butyl titanate. The butyl titanate product was practically water-white and was found by analysis to contain 23.5% titanium (calculated as $TiO_2$), which corresponds to the theoretical titanium content of pure tetrabutyl titanate. The product contained only 0.005% chlorine, indicating the substantial absence of unreacted TiCl4 or chlorine-containing organotitanates.

The solid residue, which was left behind in the still bottom, was analyzed and found to contain about 50% titanium, calculated as $TiO_2$, and apparently consisted of condensed titanates.

Example II

This example is presented to show that tetrabutyl titanate may be formed by the procedure described in Example I except that the amount of ammonium chloride formed may be decreased. This is accomplished by blowing air through the mixture of TiCl4 and alcohol to remove a portion of the HCl from the mixture before introducing the mixture to the liquid ammonia.

A mixture of 1520 parts of TiCl4 and 2370 parts of n-butanol was prepared according to the procedure described in Example I. These quantities are substantially stoichiometric proportions to produce tetrabutyl titanate. After completion of the mixing operation, a stream of air was bubbled through the mixture for 12 hours while the solution was maintained at 55° C., in order to sweep out a portion of the HCl formed by the reaction between TiCl4 and butanol. The mixture was analyzed after completion of the air treatment, and was found to contain 18.1% titanium (calculated as $TiO_2$) and 21.8% chlorine, indicating that about 32% of the theoretical quantity of HCl formed in the reaction had been removed. This air-blown mixture still represented substantially stoichiometric proportions of butanol and TiCl4.

67 parts of additional butanol were added to 400 parts of this air-blown mixture, giving a 25% excess over the theoretical requirement of butanol. The resulting mixture was then added over a period of 34 minutes to a closed reactor containing 462 parts of ammonia in the liquid state, at 20° C. and 120 p. s. i. pressure. During the addition period the temperature rose to 41° C. and the pressure to 210 p. s. i. Two layers were formed, as in Example I. The lower of these layers was drawn off by gravity and distilled giving a fore-run containing 28.6 parts of n-butanol boiling at 117–119° C. (760 mm.) and the main distillate of 237 parts of tetrabutyl titanate, boiling at 160–162° C. (3 mm). This coresponded to 76.8% of the theoretical yield of alkyl titanate.

In order to recover the remainder of the excess butanol used and the ammonium chloride by-product, the ammonia phase was also drawn off, and the ammonia was flashed off at atmospheric pressure leaving a mixture of butanol with solid ammonium chloride. The ammonia was liquefied for further use, and the butanol and ammonium chloride were separated by heating at about 130° C. to drive off the butanol. 32.6 parts of butanol and 109 parts of NH4Cl were recovered. The butanol was combined with that previously recovered from the tetrabutyl titanate layer, and the whole was incorporated into the reaction mixture for a subsequent cycle. The ammonium chloride was treated with lime to regenerate NH3 which was liquefied for recycling.

Example III

In order to prepare tetrabutyl titanate using substantially stoichiometric proportions of butanol and TiCl4, the following procedure was employed:

400 parts of the air-blown mixture from Example II, which had been prepared by mixing substantially stoichiometric proportions of n-butanol and TiCl4 to produce tetrabutyl titanate, were added without enrichment in butanol to a closed, water-jacketed reactor containing 462 parts of liquid ammonia. The addition took place over a period of 54 minutes. During the addition period, the temperature in the reactor rose from 22 to 43° C. and the corresponding pressure from 125 p. s. i. to 230 p. s. i. The lower layer was drawn off and distilled as in Examples I and II, and gave 222.5 parts of tetrabutyl titanate boiling at 160–162° C. (3 mm. absolute pressure), which was equal to 72.5% of the theoretical quantity. The distilled product contained 0.0007% chlorine, indicating the substantial absence of unreacted or partially reacted TiCl4. 7.5 parts of butanol were recovered from the butyl titanate layer by distillation. 29.1 parts of solid residue remained after distillation of the butyl titanate, and were found by analysis to contain 43.6% $TiO_2$. This residue was presumed to be a mixture of condensed titanates.

Example IV

In order to prepare tetra (5-ethyl-2-nonyl)

titanate, 110 parts of TiCl₄ were added dropwise to 500 parts of 5-ethylnonanol-2 over a period of 1 hour. This mixture corresponds to a 25% excess of alcohol over the stoichiometric requirement to produce the tetraalkylorthotitanate. The temperature of the mixture during the addition was held between 20 and 25° C. by external cooling, using a water-jacket. HCl was evolved toward the end of the addition, at a rate similar in magnitude to that observed in Example I. When the addition was complete, the mixture was a homogeneous yellow liquid, containing 7.37% titanium (calculated as TiO₂).

500 parts of this liquid were added under pressure over a period of 24 minutes to a reactor containing 462 parts of liquid ammonia at 22° C. and 120 p. s. i. pressure. During the addition, the temperature and pressure rose to 33° C. and 170 p. s. i., respectively.

Two liquid layers were formed in the reactor, the upper layer containing the ammonium chloride by-product and portions of the excess alcohol dissolved in liquid ammonia, and the lower being the alkyl titanate product, contaminated with additional excess alcohol. The lower layer was drawn off and the alcohol removed by distillation; the remaining alkyl titanate had a specific gravity of $$0.9012 \left( \frac{26° C.}{4} \right)$$

and a boiling point of 255° C. at a pressure of less than 1 mm. of mercury, and contained 11.6% titanium, calculated as TiO₂, which is close to the theoretical titanium content of pure tetra (5-ethyl-2-nonyl) titanate. The yield of alkyl titanate product was 255 parts, or 78% of the theoretical quantity.

*Example V*

In order to prepare tetra (2-(1,3,3-trimethylbutyl)-5,7,7-trimethyloctyl) titanate, 166.2 parts of 2-(1,3,-trimethylbutyl) - 5,7,7 - trimethyloctanol were added over a period of one hour to 27.8 parts of TiCl₄. This mixture represented approximately 5% excess of alcohol over the stoichiometric requirement to produce the corresponding tetraalkyl titanate. A water-jacket was employed to keep the temperature between 20 and 25° C. The mixture after completion of the addition was an amber liquid.

This liquid was added under pressure over a period of 30 minutes to a closed, water-jacketed reactor containing 300 parts of liquid ammonia at 22° C. and 120 p. s. i. pressure. The temperature rose from 22 to 30° C. and the pressure from 120 to 180 p. s. i. during the addition.

At the end of the addition time, the mixture was present as two distinct layers. The lower layer was withdrawn and excess alcohol stripped off by heating under reduced pressure. The remainder of the lower layer was essentially pure tetra (2-(1,3,3-trimethylbutyl)-5,7,7 - trimethyloctyl) titanate, having a boiling point of 305° C. at less than 1 mm. of mercury pressure, and containing 7.5% TiO₂, which is close to the theoretical titanium content of the tetraalkyl titanate. The yield of this product was 119.5 parts, which is 72.5% of the theoretical yield.

As shown in the foregoing description and by the examples presented above, the present invention provides a process for the preparation of alkyl titanates by reacting TiCl₄ with alcohols in the presence of a liquid ammonia reaction medium. By such a process the ammonium chloride formed is solubilized in the liquid ammonia, and can therefore be readily separated from the alkyl titanate product without resorting to a troublesome filtration step which involves cumbersome equipment, difficult operation, and results in losses of product.

The alkyl titanate products obtained by the instant invention are substantially pure, and high yields are obtained by utilization of such a process which is easy to employ and economical to operate. Moreover, the method of preparation is rapid, simple in operation and maintenance and requires only common, inexpensive equipment.

While this invention has been described and illustrated by the examples shown, it is not intended to be strictly limited thereto and other modifications and variations may be employed within the scope of the following claims.

I claim.

1. Method for preparation of alkyl titanates which comprises admixing titanium tetrachloride, an alcohol selected from the group consisting of primary and secondary monohydric non-substituted aliphatic alcohols having at least two carbon atoms, and liquefied ammonia in a closed system, said ammonia being present in amount at least equal to that required to react with the chloride ions released from the tetrachloride plus that required to dissolve the ammonium chloride formed by the reaction, and separating the liquid alkyl titanate layer from the liquid ammonia-ammonium chloride layer, the entire process being carried out in the anhydrous state.

2. Method according to claim 1, in which said alcohol contains from 2 to 20 carbon atoms.

3. Method according to claim 1, in which said ammonia is present in an amount in excess of that required to react with the chloride ions released from the tetrachloride plus that required to dissolve the ammonium chloride formed by the reaction.

4. Method according to claim 1, in which the density of the liquid alkyl titanate differs from the density of the liquid ammonia-ammonium chloride layer by at least 0.01 gm. per cc.

5. Method according to claim 1, in which said titanium tetrachloride and said alcohol are admixed to form a mixture, and said mixture is subsequently added to said ammonia.

6. Method according to claim 5 in which said mixture is treated with a stream of non-reacting gas prior to addition of said mixture to said ammonia.

7. Method according to claim 1 in which said alkyl titanate is tetrabutyl titanate.

8. Method according to claim 1 in which said alkyl titanate is tetra (5-ethyl-2-nonyl) titanate.

9. Method according to claim 1 in which said alkyl titanate is tetra (2-(1,3,3-trimethylbutyl)-5,7,7-trimethyloctyl) titanate.

DANIEL F. HERMAN.

References Cited in the file of this patent

FOREIGN PATENTS

| Number | Country | Date |
|---|---|---|
| 479,470 | Great Britain | Feb. 7, 1938 |

OTHER REFERENCES

Kraitzer et al.: Jour. Oil Colour Chem. Assoc., vol. 31, pages 409–410 (1948).

Cullinane et al.: "Nature," vol. 164, No. 4173, Oct. 22, 1949, pages 710–711.

Cullinane et al.: J. Soc. Chem. Ins., vol. 69, #1, 1950.